United States Patent [19]
Grey et al.

[11] Patent Number: 6,131,376
[45] Date of Patent: Oct. 17, 2000

[54] RECYCLE SHIPPING ASSEMBLY

[75] Inventors: Michael J. Grey, Richboro, Pa.; Wayne Williams, Boxford; William H. Shaw, Manchester, both of Mass.

[73] Assignee: Re-Source America IP, Wilmington, Del.

[21] Appl. No.: 09/089,797

[22] Filed: Jun. 3, 1998

Related U.S. Application Data

[63] Continuation of application No. 08/630,917, Apr. 5, 1996, Pat. No. 5,794,414, which is a continuation of application No. 08/461,045, Jun. 5, 1995, Pat. No. 5,542,237, which is a continuation of application No. 08/071,234, Jun. 2, 1993, Pat. No. 5,456,061, which is a continuation of application No. 07/775,694, Oct. 10, 1991, Pat. No. 5,247,747, which is a continuation of application No. 07/690,082, Apr. 23, 1991, Pat. No. 5,131,212, which is a continuation-in-part of application No. 07/427,812, Oct. 26, 1989, abandoned.

[51] Int. Cl.[7] .......................... B65B 23/00; B65B 61/02; B65D 73/02; B65D 85/42
[52] U.S. Cl. .................................. 53/472; 53/411; 53/474
[58] Field of Search .............................. 53/472, 411, 473, 53/474, 468, 467, 458, 396, 284.5, 266.1; 206/334, 499, 587, 600, 523; 229/921; 29/402.08, 402.03, 403.1

[56] References Cited

U.S. PATENT DOCUMENTS

| | | |
|---|---|---|
| 910,576 | 1/1909 | Randall . |
| 1,401,399 | 12/1921 | Gaspar . |

(List continued on next page.)

FOREIGN PATENT DOCUMENTS

| | | |
|---|---|---|
| 2081678 | 2/1982 | United Kingdom . |
| 2218406 A | 11/1989 | United Kingdom . |
| 06195 | 5/1991 | WIPO . |
| WO91/06477 | 5/1991 | WIPO . |

OTHER PUBLICATIONS

Disclosure of Dale Rogers under F.R.C.P. 26(A)(2).
"Lycra™ Package", DuPont, date unknown, 14 pages.
"Returnable Packaging", Du Pont Aug. 1993, 43 pages.
"Returnable Packaging Manual", DuPont, Aug. 1980, 14 pages.
"Returnable/Reusable Containers, Pallets and Totes" Tuscarora Incorporated, Oct. 1993, 26 pages.
"Textile Fibers Returnable Packaging", DuPont, Jul. 1988, 31 pages.
"Republic Packaging of Florida Wins 'Award of Merit'," Republic Plain Dealer, vol. 1, No. 73, Apr., 1992, p. 6.
Announcement by XYTEC, Inc. on Aug. 28, 1989 re recycling plant for molded plastic material–handling container.
Article on DuPont's "Revpac" returnable components, date unknown, 2 pages.
Article on DuPont's "Revpac" returnable components, Wilmington, DE, Nov. 1980, 2 pages.
Coulter Electronics, Inc., "Coulter T–Series Package", 1991, pp. 1–5.
Mitchell, John A., "I get cost effective protective packaging combined with recyclability from Republic Packaging", EE–Evaluation Engineering, May, 1993, p. 120.
Textile Products and Processes, vol. III, No. VI, Jun. 1980, 2 pages.

(List continued on next page.)

Primary Examiner—James F. Coan
Attorney, Agent, or Firm—Testa Hurwitz & Thibeault LLP

[57] ABSTRACT

A cushioned shipping assembly includes a carton and foam inserts to support a product shipped by a supplier, which elements are successively returned by an end user to be reused in the same or other shipping assembly, while various components are recycled as they become spent. In some embodiments, the carton collapses to a diminished size for return. A resource center reroutes or refurbishes the components, recycling aged or spend pieces. On-premises pelletizing of reclaimed polymer provides a more efficient, environmentally clean system. Spent inserts of identified polymer may be diverted to users of specific resins.

16 Claims, 7 Drawing Sheets

U.S. PATENT DOCUMENTS

| | | | |
|---|---|---|---|
| 1,405,002 | 1/1922 | Rhodes . | |
| 1,570,533 | 1/1926 | Styll . | |
| 1,944,980 | 1/1934 | Hayes | 229/301 X |
| 2,132,956 | 10/1938 | Kieckhefer . | |
| 2,229,223 | 1/1941 | Rhodes | 229/6 |
| 2,341,845 | 2/1944 | Mark et al. | 229/3.1 |
| 2,367,520 | 1/1945 | Patek | 229/3.1 |
| 3,015,197 | 1/1962 | Eichorn | 53/208 |
| 3,103,307 | 9/1963 | Shapiro . | |
| 3,148,821 | 9/1964 | Gardiner . | |
| 3,292,778 | 12/1966 | Enderle | 206/65 |
| 3,334,798 | 8/1967 | Pezely, Jr. et al. | 229/16 |
| 3,356,209 | 12/1967 | Pezely, Jr. | 206/46 |
| 3,416,648 | 12/1968 | Levi | 206/523 X |
| 3,421,679 | 1/1969 | Goldman | 229/15 |
| 3,463,343 | 8/1969 | Asenbauer | 220/8 |
| 3,531,040 | 9/1970 | Myny . | |
| 3,546,055 | 12/1970 | Spertus | 206/523 X |
| 3,564,811 | 2/1971 | Freeman | 206/523 |
| 3,565,243 | 2/1971 | Freeman | 206/523 |
| 3,613,219 | 10/1971 | Fisher . | |
| 3,701,465 | 10/1972 | Richter | 206/523 |
| 3,750,871 | 8/1973 | Cook | 206/523 |
| 3,854,650 | 12/1974 | Hanaue . | |
| 3,890,762 | 6/1975 | Ernst et al. | 53/472 X |
| 3,973,720 | 8/1976 | Schmid | 206/523 X |
| 3,994,433 | 11/1976 | Jenkins et al. . | |
| 4,042,108 | 8/1977 | Brethauer | 206/392 |
| 4,046,311 | 9/1977 | Voytko | 229/40 |
| 4,069,938 | 1/1978 | Palte et al. | 220/8 X |
| 4,122,946 | 10/1978 | Holley | 206/523 |
| 4,160,503 | 7/1979 | Ohlbach | 206/328 |
| 4,173,286 | 11/1979 | Stanko | 206/433 |
| 4,287,265 | 9/1981 | McKnight | 428/542 |
| 4,461,395 | 7/1984 | Burnett | 217/12 R |
| 4,468,913 | 9/1984 | Guillon et al. | 53/440 |
| 4,497,859 | 2/1985 | Baumann | 206/523 X |
| 4,498,598 | 2/1985 | Bae | 220/6 |
| 4,509,656 | 4/1985 | Rosler | 220/8 |
| 4,535,929 | 8/1985 | Sherman, II et al. | 229/39 R |
| 4,602,715 | 7/1986 | Sarver et al. | 206/523 |
| 4,640,418 | 2/1987 | Lowry | 206/499 |
| 4,700,832 | 10/1987 | Champ | 206/320 |
| 4,709,817 | 12/1987 | Keady et al. | 206/523 |
| 4,714,169 | 12/1987 | Keenan et al. | 220/8 |
| 4,724,976 | 2/1988 | Lee | 220/8 |
| 4,729,062 | 3/1988 | Anderson et al. | 361/399 |
| 4,746,059 | 5/1988 | Jackson | 206/386 X |
| 4,785,957 | 11/1988 | Beck et al. | 220/4 |
| 4,790,120 | 12/1988 | Manduley et al. | 53/468 |
| 4,807,808 | 2/1989 | Reed | 229/103 |
| 4,809,851 | 3/1989 | Oestreich, Jr. et al. | 206/599 |
| 4,836,379 | 6/1989 | Shaw | 206/523 |
| 4,840,277 | 6/1989 | Waldner | 206/523 |
| 4,848,062 | 7/1989 | Manduley et al. | 53/411 |
| 4,851,286 | 7/1989 | Maurice | 428/316.6 |
| 4,880,214 | 11/1989 | Sukai | 267/136 |
| 4,969,312 | 11/1990 | Pivert et al. | 53/472 |
| 4,972,954 | 11/1990 | Dickie | 206/523 |
| 5,036,979 | 8/1991 | Selz | 206/512 |
| 5,062,527 | 11/1991 | Westerman | 229/117 |
| 5,131,212 | 7/1992 | Grey et al. | 53/472 |
| 5,146,732 | 9/1992 | Grey et al. | 53/472 |
| 5,247,747 | 9/1993 | Grey et al. | 53/472 |
| 5,456,061 | 10/1995 | Grey et al. | 53/472 |
| 5,469,691 | 11/1995 | Grey et al. | 53/472 |
| 5,542,237 | 8/1996 | Grey et al. | 53/472 |
| 5,794,414 | 8/1998 | Grey et al. | 53/472 |

OTHER PUBLICATIONS

Tomey, "Returnable Packaging Components in Physical Distribution Systems", SPHE Technical Journal, Spring 1984, pp. 9–13.

Torok, "Returnable Containers for JIT Handling", Material Handling Engineering 44(11):48–50 (1989).

UPS Authorized Return Service[SM], "*UPS Authorized Return Service[SM]—Making the most of your resources*", Aug. 1992, pp. 1–9.

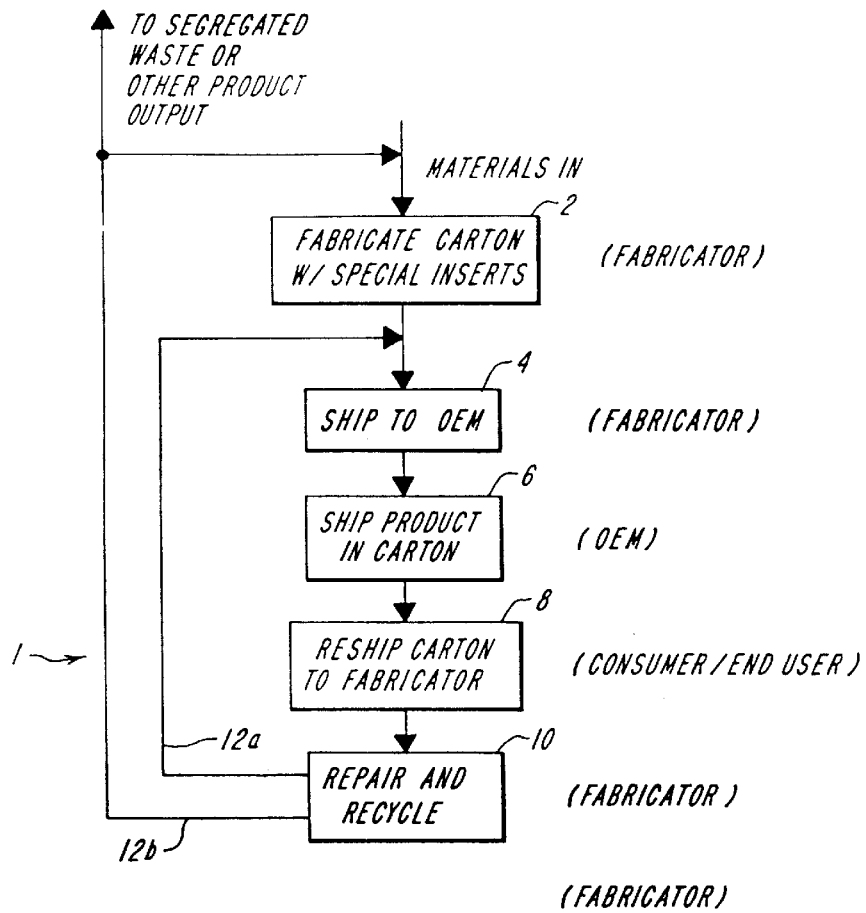

RECYCLE SHIPPING ASSEMBLY

RELATED APPLICATIONS

This application is a continuation of Ser. No. 08/630,917, filed on Apr. 5, 1996, now U.S. Pat. No. 5,794,414, which is a continuation of Ser. No. 08/461,045, filed on Jun. 5, 1995, now U.S. Pat. No. 5,542,237, which is a continuation of Ser. No. 08/071,234, filed on Jun. 2, 1993, now U.S. Pat. No. 5,456,061, which is a continuation of Ser. No. 07/775,694, filed on Oct. 10, 1991, now U.S. Pat. No. 5,247,747, which is a continuation of Ser. No. 07/690,082, filed on Apr. 23, 1991, now U.S. Pat. No. 5,131,212, which is a continuation-in-part of Ser. No. 07/427,812, filed on Oct. 26, 1989, and now abandoned.

BACKGROUND OF THE INVENTION

The present invention relates to packaging and shipping containers which are adapted to a particular size or shape of a product or object, and are used to enclose and protect the object against shock during shipment. In particular, it relates to such shipping containers which include cushioning or inserts.

The invention also relates in general to methods and practices for making up or fabricating such shipping containers and the ultimate disposal of waste resulting therefrom.

Such containers are commonly used for the packaging or shipment of microcomputers, CRT displays and workstations, as well as for delicate electronic or optical instruments and like consumer goods. The cushioning employed in the interior of a carton for these purposes may consist of foamed polymeric material in the form of broad sheets, rectangular blocks, or even of contoured molded foam which conforms to the shape of the object being shipped, for example. The foam material may be selected to provide protection against impact and vibration, protection against crushing, or a combination of these properties, and it may be in the form of loose inserts or in the form of cushion members permanently affixed either to the carton or to protective support or cap members that fit within the carton.

The aforesaid products generally have a container volume of up to several cubic feet, and the amount of cushioning involved in their packaging may be substantial. Where the product is an irregularly shaped object, such as a console or work station, the complexity and cost of the shipping assembly itself can be significant. Nonetheless, almost all containers of this type are single-use containers, intended to be discarded by the end user who receives the shipped product. The disposal of such packaging materials raises environmental concerns, and the nature of prior art packaging systems further renders it difficult to effect such disposal in an environmentally sound manner.

Accordingly, it is desirable to provide a more efficient and environmentally sound cushioned shipping container. It is also desirable to provide a general method for making, using and ultimately disposing of shipping containers.

SUMMARY OF THE INVENTION

These ends are achieved in accordance with a method of the present invention by providing a shipping package assembly including an external carton and one or more cushioning inserts that define a product support. After shipment of a product in the assembly, the empty assembly with its inserts, or portions thereof, is reshipped to the shipping package fabricator or authorized third party who then inspects and refurbishes the carton and the inserts to the extent necessary, and returns the assembly to the product manufacturer to ship another product. The materials employed for the carton and the cushioning inserts are each preferably adapted to withstand multiple uses, are selected to be recyclable, and are compatible with reprocessing of the other materials in the assembly.

In a preferred embodiment of the assembly for this method of fabrication and reuse, the cushioning material is formed, for example, of a polymeric material such as polyethylene foam, plastic sheet material encapsulating air pockets ("bubble wrap"), elastomeric films, inflatable plastic pieces or exothermally insulating materials, such as foamed polystyrene. The inserts can be attached or bonded to the carton by a hot-melt wax or other adhesive.

The carton can be formed of corrugated cardboard, for example, and the cardboard may be coated with a protective coating, such as a Michaelman-type or other coating to enhance its strength and resistance to water and scuffing without impairing its suitability for repulping. Other materials suitable for use to form the carton include rigid plastics such as polystyrene, or polyvinyl chloride, foamed polymers such as polystyrene or polyurethane foams, metal and wood. The carton can be a reclosable plastic carton which can be reused several times and the plastic material can be recycled after the useful life of the carton.

In particular or further preferred embodiments, the carton is of a two-piece or collapsible construction which attains a reduced size when emptied of the product, so that, once the carton is emptied, the carton and inserts may be returned to the fabricator in a smaller form. Advantageously, the carton is shipped by an alternate carrier, e.g., by a courier or by a consumer package deliver network such as UPS, which would not accept, or which would impose a rate penalty upon, the full size carton.

Preferably, the shipping assembly includes a prominent surface display and a label window with appropriate legends to assure that the assembly is routed in order to the product user and to the fabricator.

The invention also includes a method for the reclamation and reuse of post-consumer packaging materials. Preferably the packaging materials allow multiple uses of each element.

In the practice for reshipping, inspecting and resupplying completed shipping assemblies, custom containers preferably contain an identification code which specifies control data such as material type and size specifications, manufacturer identity and relevant terms governing the quantity, delivery dates required by the product shipper and cost of refurbished containers.

Preferably, each complete container assembly is shipped with a return label containing this code, which may be a freight prepaid label designating a selected carrier or package delivery service that acts under a contract to pick up and return used assemblies to the inspection and refurbishment center.

In a most preferred embodiment, the containers or the cushioning elements thereof are returned to a resource center that performs necessary inspection, and sorting and redirecting of elements or complete assemblies to their next destination. The resource centers are preferably different from both original fabricators and the manufacturer, and are set up to sort and redirect plastic stock from different suppliers and to reship or replace inserts and assemblies of different product manufacturers.

In a still further preferred embodiment, the resource centers are regional centers, located at spacings such that they span the country and such that each substantial user market lies close to a center within the bulk package delivery distance specified by the package carrier.

BRIEF DESCRIPTION OF THE DRAWINGS

These and other features of the invention will be understood from the following detailed description, taken together with drawings of illustrative embodiments, wherein FIG. 1 is a block diagram of a method according to the invention;

FIG. 2 is a table of representative materials for the structural elements contemplated for various embodiments of a cushioned shipping assembly according to the invention;

DETAILED DESCRIPTION OF THE INVENTION

The invention relates to a method of providing a cushioned shipping assembly, including the steps wherein a packaging fabricator provides to a manufacturer or other user a carton with a plurality of cushioning members suitable for the user's product, and, after the assembly has been used to ship the product to a purchaser or consumer, the carton and cushioning members, or a major portion thereof, is reshipped to a center and the entire assembly is refurbished and reprocessed and/or reused. At the end of a useful lifetime, which may vary for different components of the system, each worn component is recycled. As will be described in greater detail below, particular materials and constructions relate cooperatively to the different steps involved in reshipment, reuse and reclamation of materials to make the entire process economically and environmentally beneficial to the various persons providing or using packaging.

As shown in FIG. 1, the system 1 of the present invention includes a packaging system which is actively handled by different persons or businesses in succession. Initially at 2 the packing system, comprising a carton and any special cushioning members, is assembled from a set of materials such as corrugated panels, adhesives and bulk polymers.

The cushioning members can be, for example, made by a plastics fabricator that typically will have facilities for molding plastic foam shapes, forming or shaping plastic sheets or blocks, or casting films. Alternatively, the inserts or cushioning material can be purchased from a supplier. The fabricator may have facilities for fabricating cartons, although these may be purchased separately. In the latter case the completed shipping assembly may be put together by an ultimate product shipper or OEM, from parts supplied from at least two sources, the fabricator and/or cushioning material supplier, and a carton supplier.

At 4, the fabricator then provides the shipping assemblies or elements to an OEM, such as a manufacturer of computer terminals or the like, and at step 6 the OEM ships its product in the packaging to a distributor, end user or the like. At step 8, the emptied assembly is reshipped by the end user to the fabricator or other entity, referred to below as a resource center, which performs a number of functions relating to the inspection, recycling or reuse of packaging material.

At this point, the method of providing and handling packaging differs substantially from conventional practice, in that applicant provides a central entity (fabricator or resource center) possessing data on the carton and packaging inserts and that is responsible for routing the cartons and inserts.

Figure 8A:
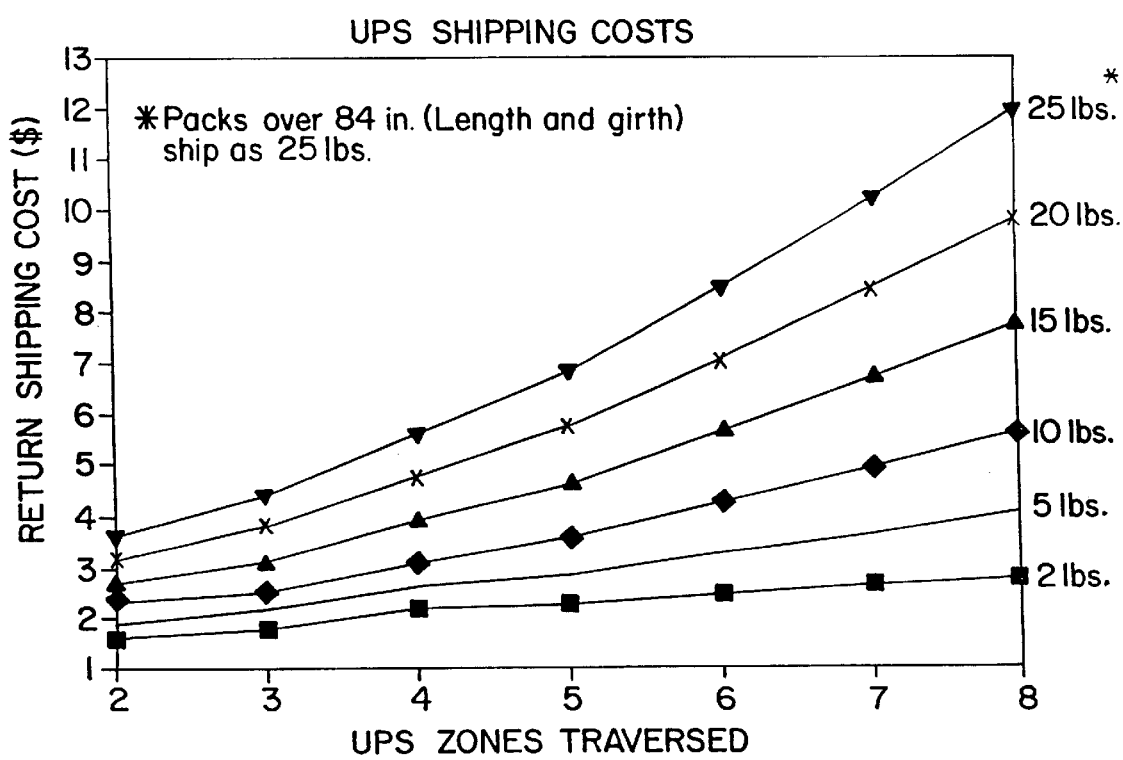
FIG. 8A, 8B are graphs showing representative shipping costs involved in freight return of packaging elements.
Figure 8B:
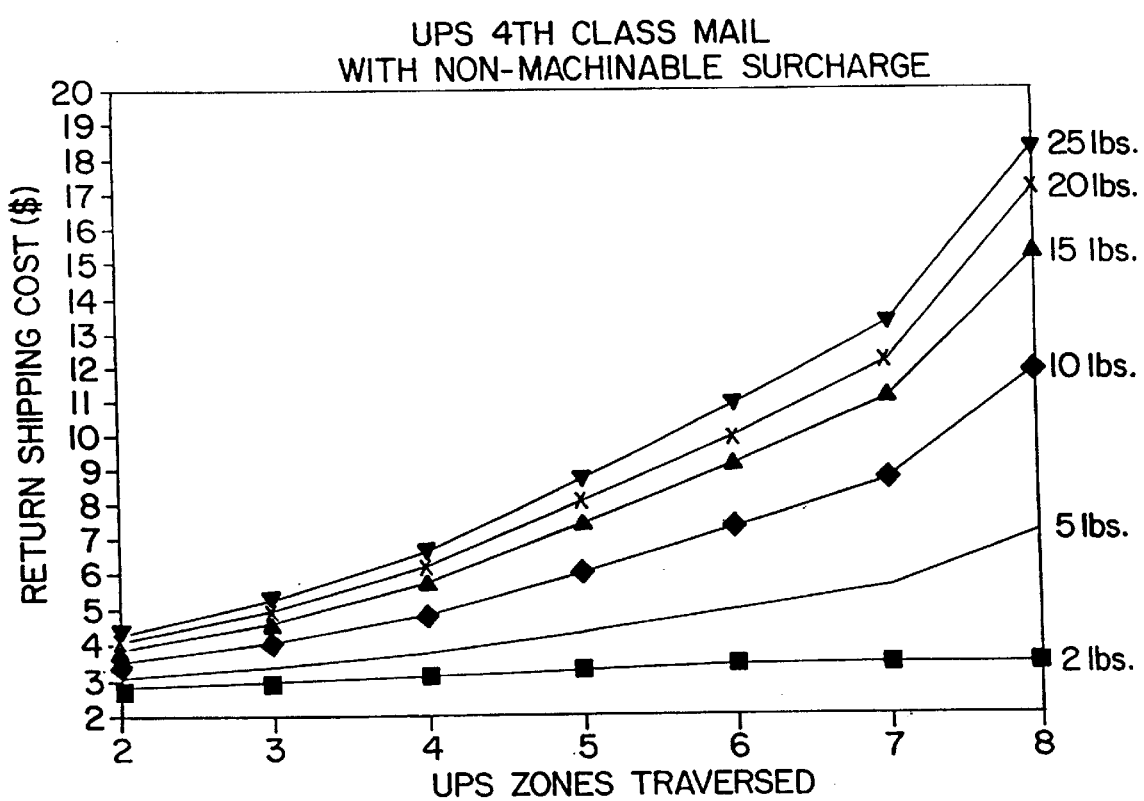
Figure 9:
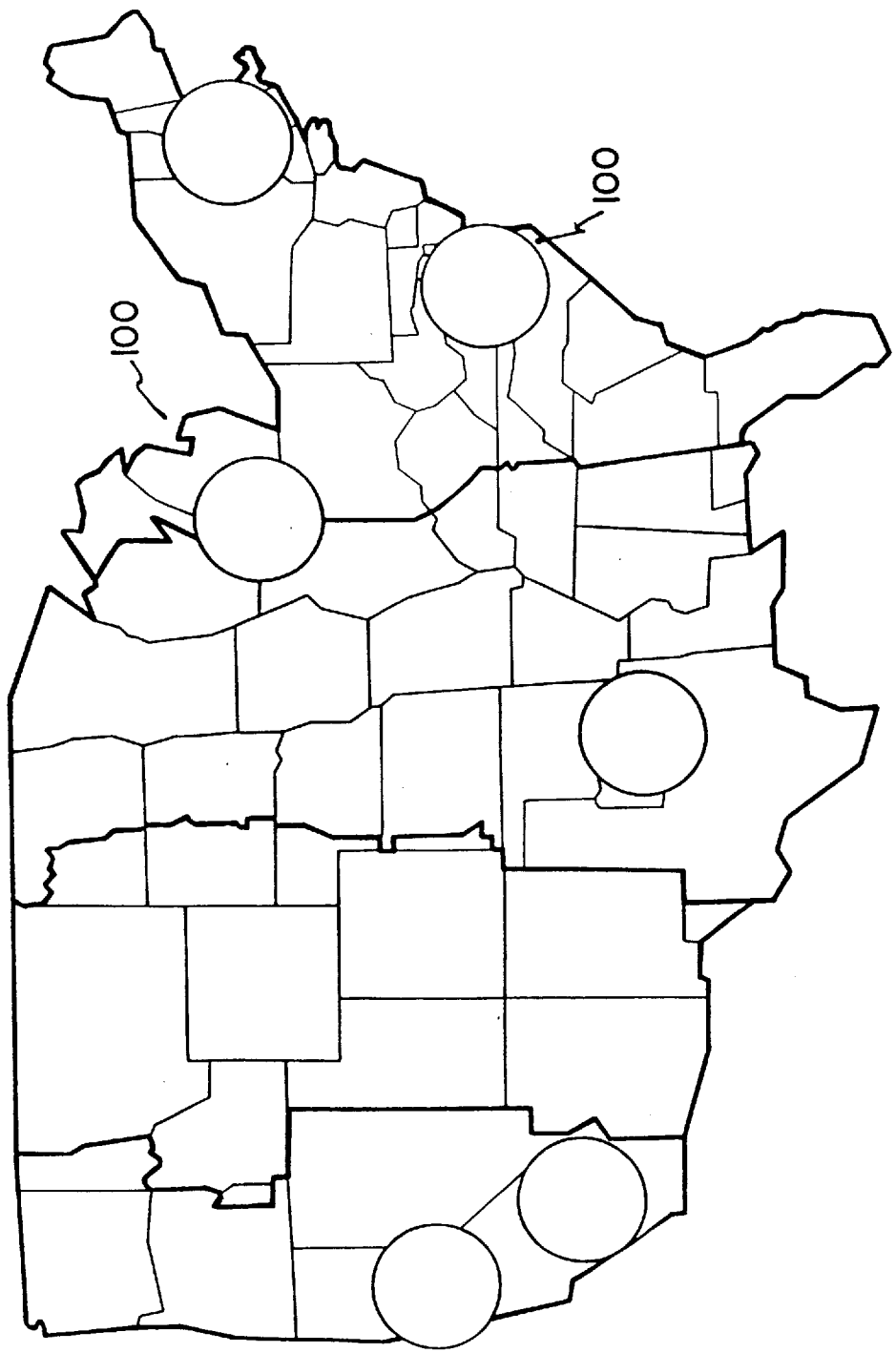
FIG. 9 illustrates one network location of sorting centers for recycling multi-component packaging in accordance with a preferred method of practicing the present invention.

In a presently preferred practice of the invention, discussed further in connection with FIGS. 8A, 8B and 9, the return of used packaging is effected via an intermediate step 8A wherein a data-coded shipping label on the package, in conjunction with a contractual arrangement with a parcel delivery network, allows the end user to have the packaging picked up and returned to a designated resource center without filling out or attaching a further shipping label. This may be implemented in one embodiment by having a UPS or other carrier's label preaffixed to the carton, together with a bar-coded identification that allows bar code readers to identify the shipment and print out a label, to route and to invoice the shipment. In this manner, the sorting and return of materials are more efficient. When the inserts of a package are made of a particular polymer resin, the label or data coding preferably also identifies the polymer, or directs the used assembly to a particular resource center that recycles that polymer resin.

Continuing with FIG. 1, at step 10 the fabricator/resource center insects and refurbishes the packaging assembly, reclaiming any spent materials for safe disposal or for recycling to a second use. At step 12, as at step 4, the packaging system is again provided to the OEM. Conceptually, step 12 involves two substeps corresponding to the different acts of refurbishing or recycling performed at step 10. In one substep, denoted 12a, the system is refurbished, which may involve one or more of the original fabrication processing of step 2. In the other substep denoted 12b, the spent components are reclaimed and recycled. This involves separately and preferably reprocessing the components, one example being forming polyethylene sheet film products from spent polyethylene foam material. The second use of a recycled component may or may not be performed on-premises, and may either result in a product useful as a shipping assembly component in step 2, or as a separate product for an external market. Thus, as indicated in the Figure, step 12b may provide further materials to be used in step 2.

It should be noted that while the end user appears only at step 8 to return the packaging to the fabricator, in some embodiments the end user's participation may be substantially greater. For example, when used for shipping medical devices and supplies to a hospital, clinic, or research laboratory, where the receiving institution may be expected to have waste segregation or processing protocols in effect, the present system contemplates that such protocols may be utilized to segregated and recycle or reship to the fabricator the used packaging assemblies or separated components thereof. For such medical packaging it is understood that the reuse of components will further include the step of sterilization of packaging for each transit.

Returning to FIG. 1, the first three steps of the method 2, 4, 6 are conventional. The remaining steps, when practiced according to the invention as discussed further below, are environmentally beneficial and offer benefits to each person. These steps involve the participation of additional persons in the system for its effectiveness. Certain preferred construction features of the system as described more fully below render the performance of these additional steps convenient to achieve, economically beneficial or functionally self-effecting.

In accordance with the invention, the materials of construction for the container system are selected from among materials which can be effectively reclaimed after use and, preferably, recycled when worn beyond reuse, by fabrication into the same, or new and different products. Materials useful for forming the carton include wood-fiber based products, e.g. paper or cardboard; metals; formable plastics, e.g., polyvinyl chloride; foamed polymers, e.g., polystyrene foam or polyurethane foam; and wood. The carton is prefebly corrugated cardboard or plastic.

The cushioning inserts can be formed from a variety of materials based upon the end use. Cushioning materials can include foamed material such as polyurethane foam or polyethylene foams; plastic films, e.g., elastomeric films; plastic sheets having plural entrapped air bubbles (conventionally referred to as "bubble wrap"); thermally insulting materials, such as polystyrene foam and other materials useful for packing hot or cold materials e.g., dry ice; expanded mica ("vermiculite"); foam "end caps", which are shaped articles of a polymeric foam the shape of which is specific for the object being shipped; and inflatable plastic articles. All of the cushioning materials are selected so that they can be reused, reprocessed or recycled.

In one embodiment of the present invention, bubble wrap made from polyethylene sheets, or other plastic material, is used as the cushioning material in a container. Once the user has removed the object from the carton, the carton containing the bubble wrap is picked up by the parcel service and returned to the fabricator or third party.

In another embodiment of the invention, inflatable plastic bladders are used as cushioning material. In this embodiment, the shipping carton containing plastic bladders in deflated condition are shipped to an OEM, who inflates the bladders with air according to his requirements. The product to be shipped is packed in the carton and is cushioned by the inflated bladders. The product is shipped to the product user, who then deflates the bladders, and returns them, preferably packed in the original container, to the designated third party. The container and/or the inflatable cushioning materials can be refurbished, if necessary, and reused or recycled. Alternatively, the carton can be disposed locally, and the deflated bladders returned to the fabricator or third party, for example, in a prepaid, preaddressed envelope or package.

Foams useful as cushioning materials preferably include foams which provide shock resistance without crushing, so that the cushion blocks perform effectively for at least several initial usages, and which also may be recycled into second-use products, such as films or denser extruded products. Preferably the cushion blocks are designed to survive multiple shipping/storage cycles without falling below a specified level of cushioning quality. This is achieved in part by providing larger "footing" or contact surfaces for a given product application, employing a lesser static loading value to determine the size of cushion blocks for a particular product, and by compounding the foam to have relatively longer-lived mechanical properties.

The material employed for the foam is preferably resilient and the stock polymer material is not highly cross-linked. Suitable foams are polyethylene foam, polypropylene foam, EVA and other polyolefin foams, and also copolymers thereof, among others. The cushioning elements also include non-attached loose fill cushioning, such as sheet foam and pellet material. The invention contemplates that the worn cushion members will generally be reprocessed by densifying the foam back into pellets of stock polymer, and that this material will be recycled, either at the fabricator, or elsewhere under contract, into film or other plastic product. It is contemplated that the adhesives used for adhering the board elements to the cushion blocks, or to cement folds of the carton upon itself, preferably include hot melt waxes, olefins or bonding materials that are compatible with the two principal packaging components and with the processes involved in their recycling.

In one embodiment of the present invention, the container is fabricated from a formable plastic material, such as polyvinylchloride sheets. The container can be fabricated by any known method for forming plastic shaped articles, such as stamping from a sheet with a dye, compression molding, vacuum forming, etc. The cushioning inserts in the container are determined by the nature and configuration of the object to be packed in the carton. The cushioning material can be elastomeric films, such as polyurethane films, for example, which suspend the object within the carton, or can be inflatable plastic bladders which are inflated for packing and shipping and which can be subsequently deflated and returned to the resource center as a much smaller package.

In accordance with a first preferred aspect of the invention, FIG. 2 sets forth a table, by way of example, showing representative materials which may be used for cushioning, bonding, and carton coating in a system for a corrugated cardboard or pulp-based packaging construction in accordance with the present invention.

As shown in the Table, the invention contemplates that one or more coatings or layers will be applied to a corrugated cardboard container to implement the combination of recyclable elements thereof. These may include coatings to strengthen the skin of the board, so that the cushioning, shipping labels and the like may be removed without damaging the container and so that surface blemishes from impact are minimized, and also may include release coatings for labels, and waterproofing coatings and scrubbable surface coatings to prevent the accumulation of soil on the carton in use. Suitable coatings include Michaelman coatings such as a Michaelman X-300, another surface films and release coatings which do not impair the suitability of the board for repulping and reuse.

Within one or more of the above constructions, the invention contemplates that the return of the used assembly to the fabricator or resource center be facilitated or enhanced by providing a prominent graphic display instructing the user how to return the container or components thereof. For example, a block print legend is preferably printed under, or adjacent to, a removable invoice/label pocket, bearing the legend "THIS IS A (DEPOSIT-TYPE) RETURNABLE ENVIRONMENTAL RECYCLABLE CONTAINER. PLEASE DELIVER TO OR CALL UNITED PARCEL SERVICE TO PICK UP THIS CONTAINER UNDER

CONTRACT AXXXXX FOR RETURN TO XYZ FABRICATOR, CITY, STATE."

In the practice of the invention, it is contemplated that when used in conjunction with a manufacturer's ordering, shipping and production software systems, several different such legends may be automatically printed out on labels which direct the return either to the fabricator/resource center (when reuse is contemplated), or to a local reclamation center (when the carton is configured for a product for which no further shipments are scheduled). The label preferably includes data (such as a bar-coded number which may index a specification file) that identifies necessary information for routing, testing, refurbishing, reusing or scheduling delivery of the packaging elements. For example, the data may indicate the part number of an insert, the identity and supply requirements schedule of an OEM that uses the inserts, and the material composition of the inserts. The data may also include an index to a file record that contains detailed contract information, such as the amount of credit allotted to a fabricator for each returned insert, the schedule of charges to the OEM for each reused insert, and the like.

It will be appreciated that the system of the present invention achieves a significant efficiency of materials consumption since the reuse of the packaging system even two or three times results in effectively using a half or a third as much material per transit; minor refurbishing offers greater savings. The invention thus operates to reduce net consumption, as well as to recycle the used materials.

Figure 3:
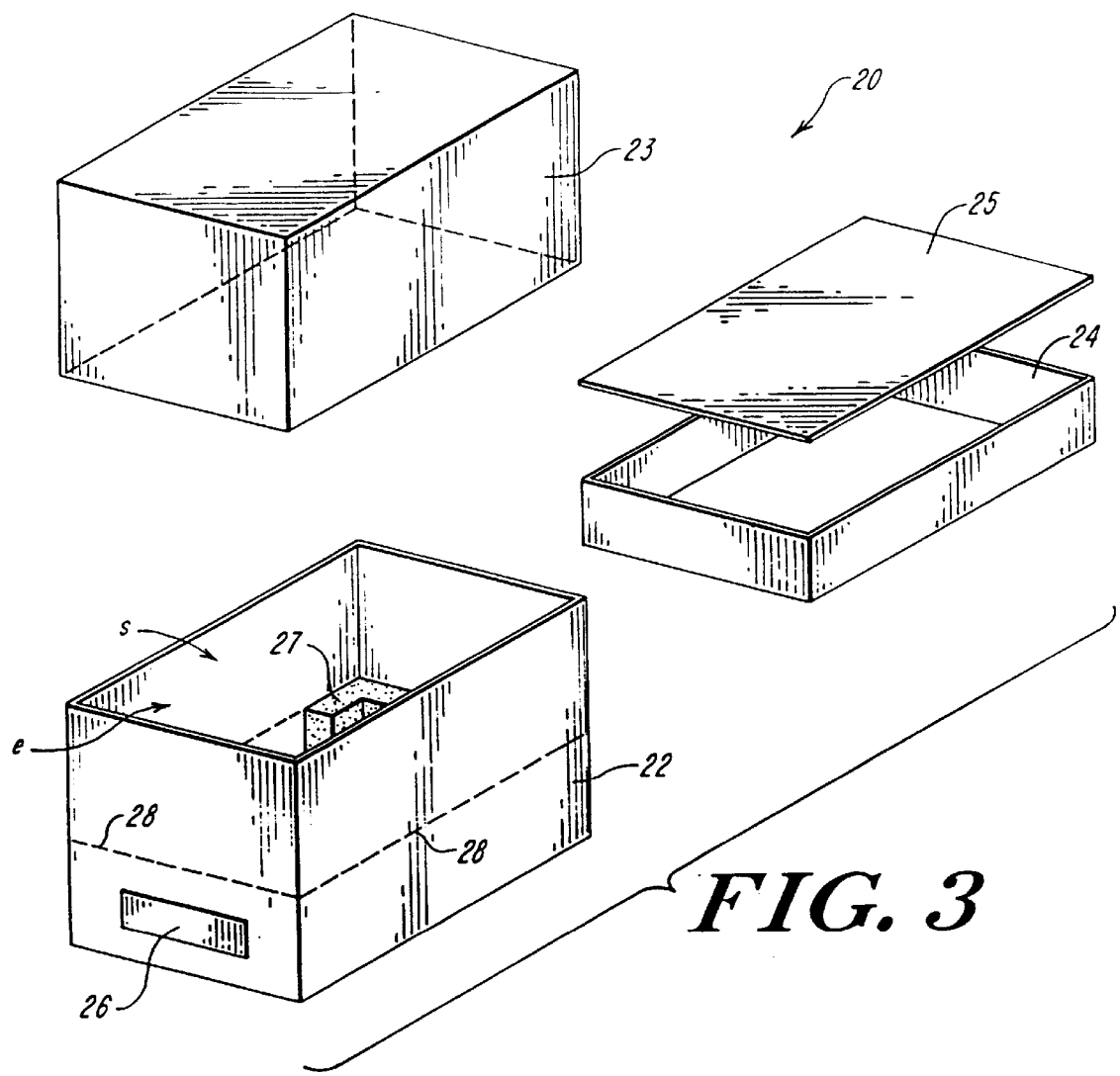
FIG. 3 is a perspective view of one embodiment of a carton which may be employed in accordance with the invention.

FIG. 3 illustrates one exemplary embodiment of the invention. A carton 20 is formed of a bottom 22, a top 23 and preferably one or more cardboard inserts 24, 25. Bottom 22 is formed of a high strength double walled corrugated board, and, as illustrated, has the above-described fabricator return freight legend 26 on an outer face thereof. Top 23 is formed of a lightweight material and forms a cap which telescopically slides over the bottom portion to form a closed box. Top 23, which may have a calendared, printed surface, is discarded after shipping, while bottom 22 containing at least one of attached cushioning 27 and separate attached cushion blocks (not shown) is closed and reshipped to the fabricator after use. Arrows "s" and "e" indicate that the sides and ends form flaps, which fold down along score lines 28, to close the carton into a diminished volume for return. A top sheet 25, which may also have an attached cushion block and which is also returned with the bottom half 22, normally fits over the bottom 22, and may serve both to prevent the flaps from folding inward, and to provide additional wall strength and protection for the top face. An inner sleeve 24 may also be provided, after the first use and creasing of the flaps of bottom 22, to prevent folding in of the upper sides which have previously served as flaps.

Figure 4:
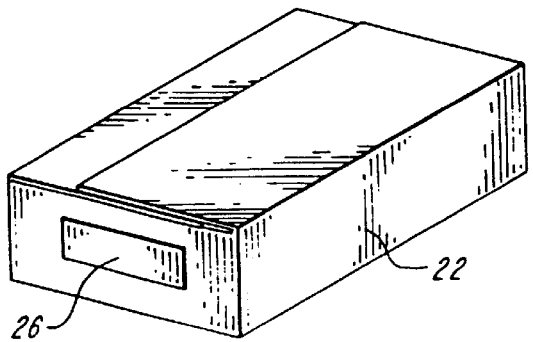
FIG. 4 illustrates the carton of FIG. 3 in a collapsed state for return to the fabricator.

FIG. 4 shows the portion of the assembly 20 consisting of bottom 22 and one or more of cushions 27, unattended blocks and inserts 25, folded into a closed position for return. In this position the combined external dimensions of the carton assembly are reduced to be less than 108 running inches or such other limit imposed by a parcel service, such as the federal postal service or United Parcel Service, so that the container may be economically returned, by single units rather than truckload lots, to the fabricator. It will be understood that when the product to be shipped fits in a packaging assembly that already meets the dimensional requirements of the parcel carrier, the use of the fold down carton of FIGS. 3, 4 is optional, or if used, the assembly may be returned in its original full size configuration, without folding down.

The significance of the telescoping or collapsible carton will be better appreciated with reference to FIGS. 8A and 8B. These Figures are charts of shipping costs of packages, in dollars, for shipments by private UPS carrier (FIG. 8A) and by US postal service fourth class (FIG. 8B). As clearly shown in these rate charts, costs escalate not only with package weight, but also with distance shipped as measured in zones traversed. For UPS shipments, packages having a combined length plus girth greater than a seven foot threshold are automatically charged at the highest, twenty-five pound, rate even if the package in fact weighs only several pounds. This results in a two-to-six-fold cost increase. Similarly, for US postal rates, a "non-machinable surcharge" increases the rate for packages of a size above a threshold that precludes passage through the automated handling systems of the postal service.

Thus, in embodiments like that of FIGS. 3, 4 the degree of compacting of the returnable carton preferably is selected to bring the return carton to a size below the threshold associated with these rate penalties, and to assure that the ratio of returned element value to the cost of returning those elements is as low as possible.

In one further embodiment of this aspect of the inventions, this is accomplished by providing a return sack or envelope rather than a carton. Upon receipt by the user, the polymer inserts are removed from the board elements of the carton, and the inserts from one or more units are placed in a return-labeled sack or envelope for delivery to the fabricator/resource center. The pulp-based board elements are then recycled or otherwise disposed of locally, while the inserts are freighted to be centrally sorted, recycled or reused. In this manner, the weight of returned components is minimized, and the low value locally recyclable board components are not needlessly shipped vast distances.

Figure 5:
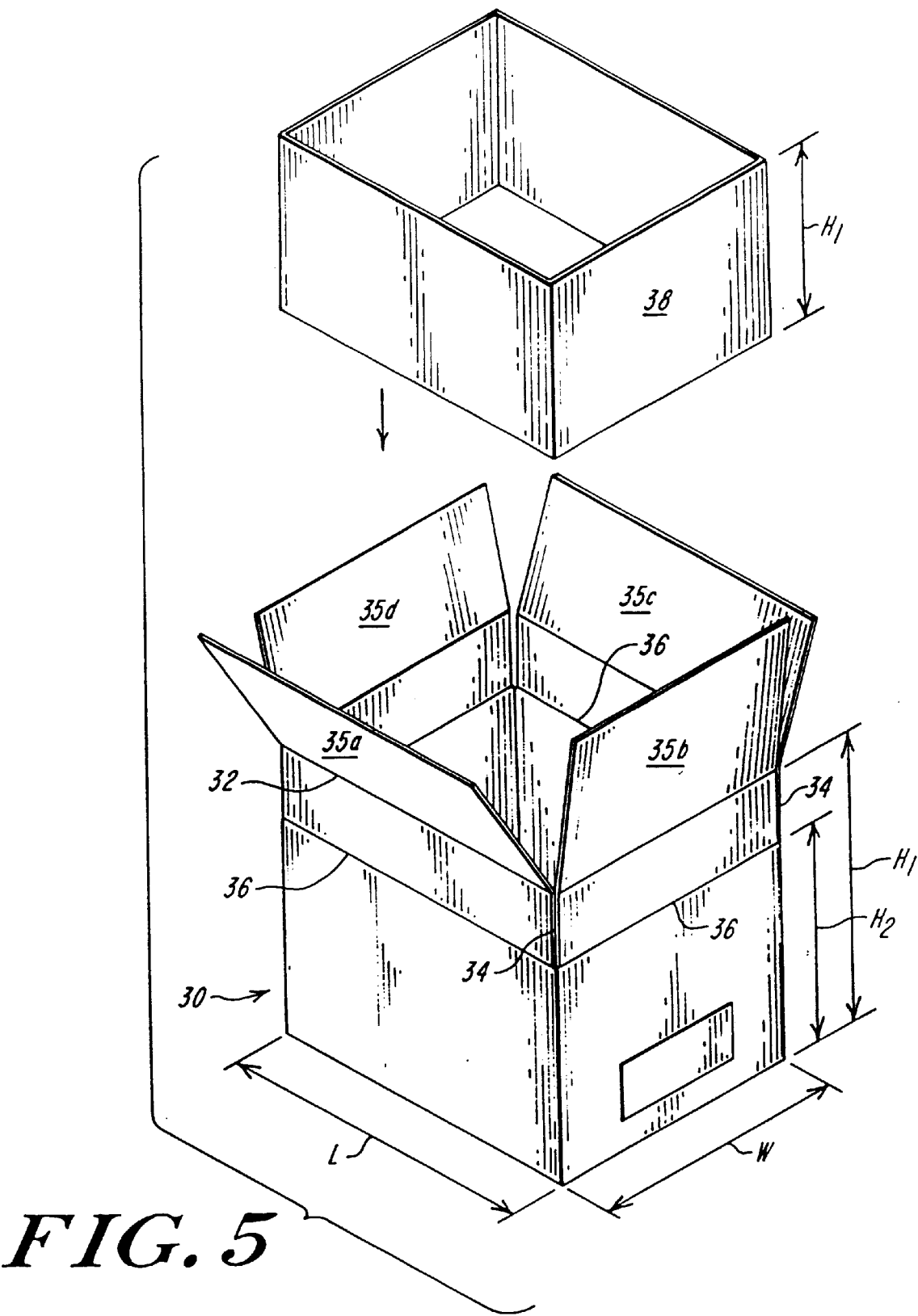
FIG. 5 illustrates another embodiment of a shipping carton in accordance with the invention.

FIG. 5 illustrates elements of another embodiment of the invention. In this embodiment, a pulp-based or cardboard carton 30 is provided having a length L, width W and height H1, with creases 32 at height H1 defining two pairs of opposed flaps for closing the carton. The vertical edges of the box are cut, i.e., slotted at 34, down to a lesser height H2, and horizontal score lines 36 are provided at height H2 which extend around the box so that after use the flaps 35a . . . 35d may be creased at the score lines 36 and folded down to provide a smaller shipping carton of diminished height H2. With normal half-width or half-length flap geometries for the original flaps 35a . . . 35d, the reduction in height achieved by this embodiment for the return container is up to one-half of the length or width of the carton. Preferable, after this carton has been once used and return, on subsequent uses an inner sleeve 38 of height H1 fits within the full-height carton to reinforce the walls for again shipping a product. The sleeve is then removed when it is again desired to return the carton in its reduced size.

Figure 6A:
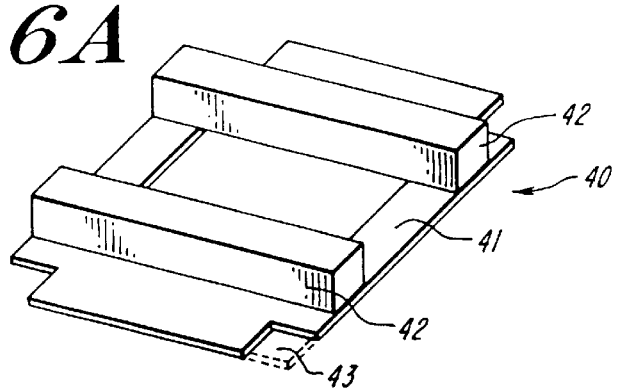
FIG. 6A, 6B illustrate one preferred set of internal components for the practice of the invention with the cartons of FIGS. 3–5.
Figure 6B:
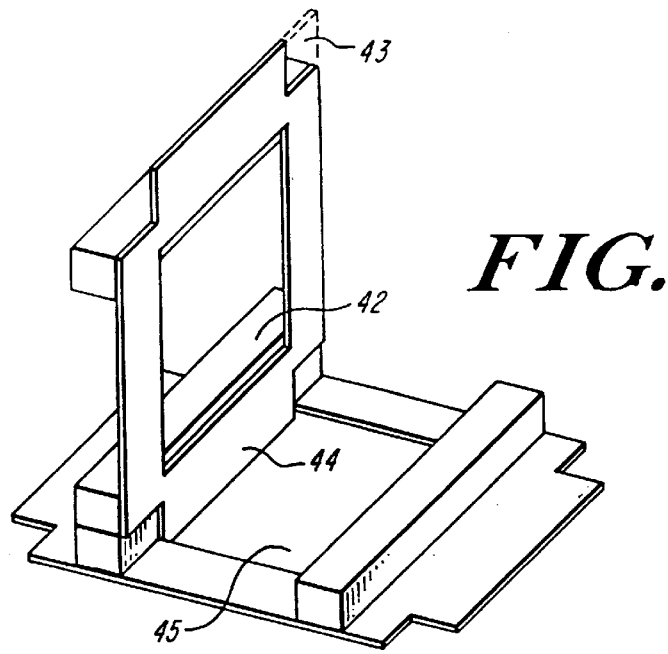

FIGS. 6A, 6B illustrate a cushioning member 40 of the type conventionally known as an end-cap, designed with particular suitability for the practice of this invention. Cushioning member 40 is illustrated as comprised of an annular board of support plate 41 and several cushion blocks 42 of substantial thickness which extend across the full width of the plate. Plate 41 may be formed of thick cardboard and dimensions substantially in the illustrated proportions, to support and position a product assembly within a like-dimensioned rectangular carton, or it may be formed of foam sheet stock like that of the blocks 42, thereby providing both a positioning and an additional shock-absorbing function. The cushion blocks 42 may face inwardly against a packaged product, to provide a product-cushioning as well as product-positioning function, or may face outward toward the carton wall, thus providing only a cushioning function. In any event, the cushion blocks 42 and the plate 41 are preferable assembled of elementary slab material.

For particular utility with this invention, the plate of foam slab 41 illustrated in FIGS. 6A, 6B is formed with a notch 43 at each corner such that the portion 44 of the plate protruding beyond the block 42 fits within the central opening 45 of the opposite plate 41. With this arrangement, a pair of cushioning members 40 may be shipped as cushioning end cap members within a container according to the invention, and when it is desired to return the container, the two members may be crossed, as illustrated in FIG. 6B. This recesses one member within the other, while providing a full-width vertically extending structure that extends between the opposed top and bottom sides of the carton and stiffens the empty carton against collapse.

Figure 7:
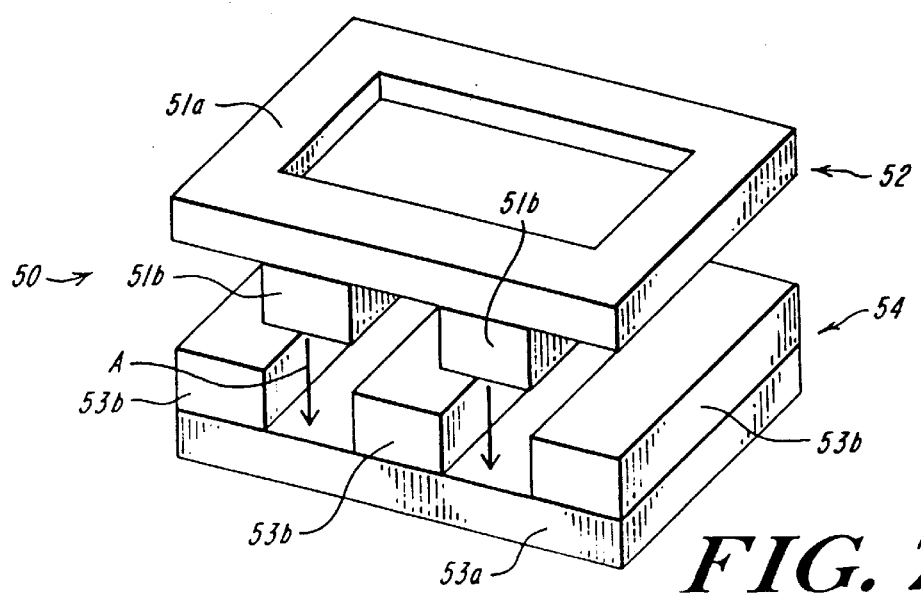
FIG. 7 illustrates different cushioning members for the practice of aspects of the invention.

FIG. 7 illustrates another suitable form of cushion insert assembly 50 for the practice of this invention. In this embodiment, a first member 52 formed of a foam sheet 51a and cross slabs 51b provides one end cap, and a second member 54 formed of a foam sheet 53a and cross slabs 53b provides another end cap. The cross slabs 51b are offset from the slabs 53b so that they interfit between each other when the product is removed and members 52, 54 are placed on each other in the emptied carton, thereby reducing the dimension required for return of the cushioning members to less than twice the height of a single cap. Other end cap constructions of a more conventional type, such as a so-called slug cap or a so-called picture frame, with the projection of one sized to fit within the recess of the other, are also contemplated within the practice of the invention. In each case the foam material preferably has the reuse, longevity or other beneficial properties described above.

Returning to FIGS. 8A, 8B, it will be seen that the cost of return inserts or cartons rises with increasing distance. For UPS shipments, the increase can be a several-fold increase for a transcontinental shipment, over the cost of shipping several hundred miles. For US postal shipments, a greater increase affects larger shipments. As described above, these costs are avoided in part by assuring that size thresholds are not exceeded, and in part by restricting the reshipment of larger assemblies to separate cushion inserts and relying on local handling of the pulp-based components.

In accordance with a further embodiment of the present invention, an effective reuse and recycling system is obtained by providing resource centers at plural locations located within two or fewer freight zones of major metropolitan areas. The centers provide a network such that each region of the nation is served by a center lying within its low-freight rate territory. As shown in FIG. 9, a half dozen such centers, indicated by markers 100, provide an effective set of collection points for receiving, sorting, and redirecting used packaging and assemblies.

In this regard, applicant contemplates that the returnable packaging assemblies according to the present invention preferably include labeling that automatically routes the returns to the nearest such center. One implementation is achieved by providing a bar-coded shipping label, similar to the coding used to indicate corporate account numbers or destinations on existing courier labels, on the assembly shipped to the end user. When the parcel service picks up the used assembly, the parcel service "reads" the code and acts in accordance with a previously arranged contract to insert the nearest resource center address. In other embodiments, the code may indicate a particular fabricator that is responsible for receiving and reusing or recycling all of that type of assembly. In still other embodiments, the appropriate resource center may be determined at the time that the OEM ships the product to an end user, based on the location of the end user. In that case, the OEM provides a label with the address of the particular resource center, so that neither the end user nor the parcel service need perform any acts beyond arranging for pick up of the parcel for return. Alternatively, the end user may be provided with a set of peel-off address labels, of which the user selects and attaches the address of the nearest resource center.

Advantageously, the coded information included on the label may include a part number or contract number which identifies the elements, such that the resource center may perform billing, accounting and other functions, as well as identify the type of foam to control the purity of recycled resin from the sorting process.

For example, the identifier number can permit retrieval of file data that gives the OEM a specified credit for a returned item, that directs the shipment of inserts back to a particular OEM location at a reuse discounted price, or that gives a reuse commission to the original fabricator when an element is sent out in a second packaging assembly. Similarly, the identifier may specify the precise resin employed in the insert and may indicate a fabricator or a resin supplier that has accepted responsibility for recycling or disposing of spent inserts.

The method and system of exemplary embodiments of the invention being thus described, variations and modifications will occur to those skilled in the art, and all such variations and modifications embodying the teachings in this disclosure, are considered to be within the scope of the invention, as set forth in the claims appended hereto.

We claim:

1. A process for recycling or reusing a shipping container, said process comprising:
   (a) providing to a product provider a shipping container comprising a product support;
   (b) sending to a customer a product supported in said shipping container;
   (c) after removal of product by said customer, returning said shipping container to a third-party refurbisher pursuant to directions wherein the third-party refurbisher is a different entity from the product provider;
   (d) reusing said shipping container if said shipping container is reusable, refurbishing said shipping container if said shipping container is refurbishable, or recycling said shipping container if said shipping container is not reusable or refurbishable; and
   (e) repeating steps (a), (b), (c) and (d).

2. The process of claim 1 wherein said product support comprises metal.

3. The process of claim 1 wherein said product support is a wood-fiber based product support.

4. The process of claim 1 wherein said shipping container further comprises an elastomer film.

5. The process of claim 1 wherein said returning step (c) comprises providing a customer with directions for returning said member to a third party refurbisher.

6. The process of claim 5 wherein said directions are provided with said shipping container.

7. The method of claim 1 further comprising the step of: discarding at least a portion of said shipping container when said portion is not reusable, refurbishable or recyclable.

8. The process of claim 1 wherein said returning step (c) comprises returning said member to a third party refurbisher by a transport service.

9. The process of claim 8 wherein said transport service is a parcel service.

10. The process of claim 1 wherein said product support comprises plastic.

11. The process of claim 1 wherein said product support comprises wood.

12. The process of claim 1 wherein said product support comprises foam.

13. The process of claim 1 wherein said product support comprises plastic film.

14. A process for recycling or reusing a product support for shipment, said process comprising:

(a) providing said product support to a product provider;

(b) sending to a customer a product supported by said product support;

(c) after removal of product by said customer, returning said product support to a third-party refurbisher pursuant to directions wherein the third-party refurbisher is a different entity from the product provider;

(d) reusing said product support if said product support is reusable, refurbishing said product support if said product support is refurbishable, or recycling said product support if said product support is not reusable or refurbishable; and (e) repeating steps (a), (b), (c) and (d).

15. The method of claim 14 further comprising the step of: discarding at least a portion of said product support when said portion is not reusable, refurbishable or recyclable.

16. A process for recycling or reusing a shipping container, said process comprising:

(a) providing to a product provider a shipping container comprising a product support;

(b) sending to a customer a product supported in said shipping container;

(c) after removal of product by said customer, returning the product support to a third-party refurbisher pursuant to directions wherein the third-party refurbisher is a different entity from the product provider;

(d) reusing said product support if said product support is reusable, refurbishing said product support if said product support is refurbishable, or recycling said product support if said product support is not reusable or refurbishable; and (e) repeating steps (a), (b), (c) and (d).

* * * * *